T. V. CLAPP.
RAT TRAP.
APPLICATION FILED APR. 3, 1917.
1,234,629.
Patented July 24, 1917.
2 SHEETS—SHEET 1.
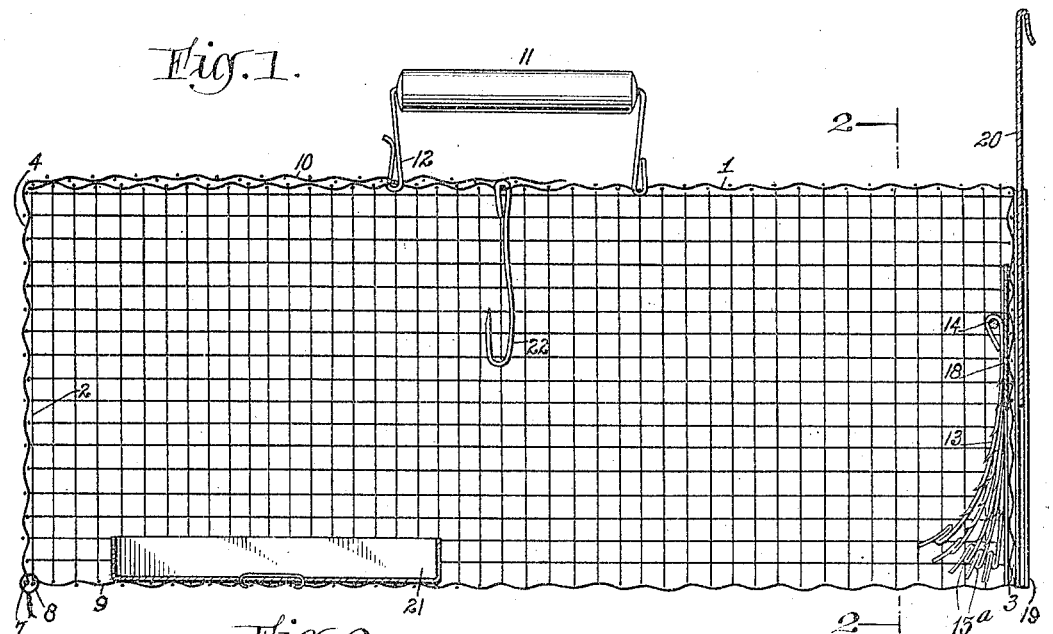
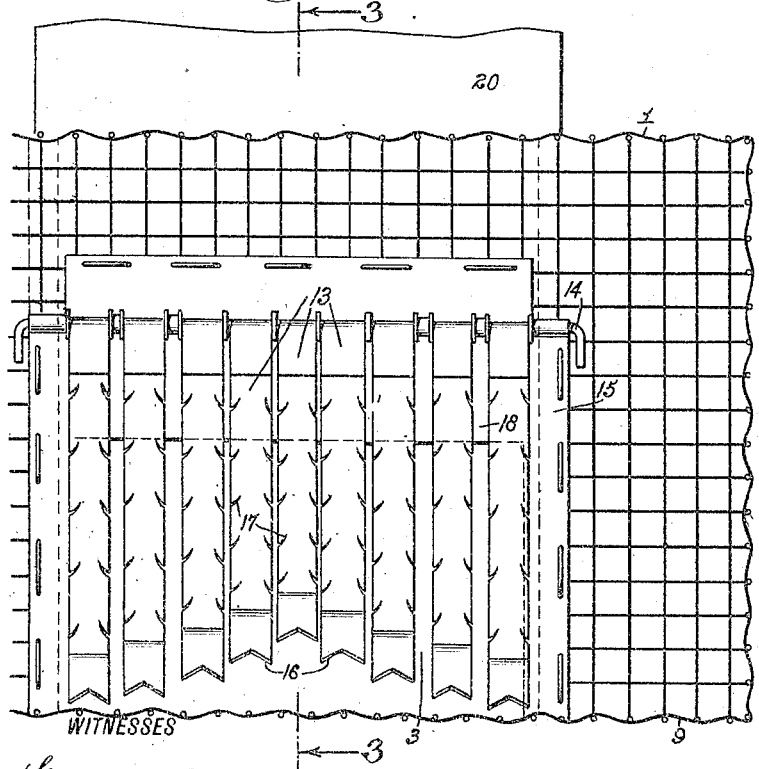
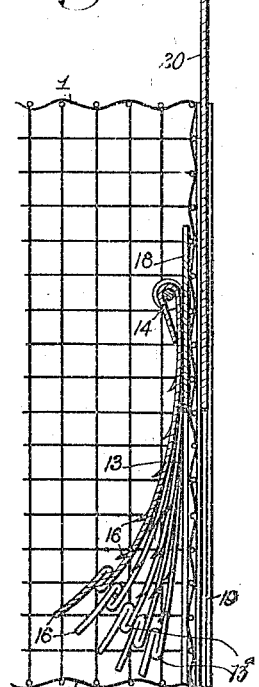
WITNESSES
Frederick Diehl.
C. Bradway.
INVENTOR
T. V. Clapp
BY
ATTORNEYS

T. V. CLAPP.
RAT TRAP.
APPLICATION FILED APR. 3, 1917.

1,234,629.

Patented July 24, 1917.
2 SHEETS—SHEET 2.

WITNESSES
Frederick Diehl.
C. Bradway

INVENTOR
T. V. Clapp
BY
ATTORNEYS

UNITED STATES PATENT OFFICE.

THEODORE VANDERBILT CLAPP, OF SPRINGFIELD, MASSACHUSETTS.

RAT-TRAP.

1,234,629.  Specification of Letters Patent.  Patented July 24, 1917.

Application filed April 3, 1917. Serial No. 159,439.

*To all whom it may concern:*

Be it known that I, THEODORE V. CLAPP, a citizen of the United States, and a resident of Springfield, in the county of Hampden and State of Massachusetts, have invented a new and Improved Rat-Trap, of which the following is a full, clear, and exact description.

This invention relates to entrapping devices for rats and other animals and has to deal particularly with a wire mesh trap of that type having a door formed of a plurality of independently movable impaling members which swing inwardly to permit the animal to enter, but which are prevented from swinging outwardly.

The invention has for its general objects to improve and simplify the construction of devices of the character referred to so as to be reliable and efficient in use, comparatively inexpensive to manufacture, and so designed as to form an effective entrapping means.

A more specific object of the invention is the provision of a novel form of gate or door device which freely admits rats or the like and effectively prevents their escape, the gate or door being self-setting or self-closing so that any number of rats may be entrapped before the device is emptied.

Another object of the invention is to provide a closure or door at one end for permitting the trap to be emptied, said door having an extension which normally lies over the top of the trap so that the handle for the trap may be employed as a locking means for holding such door closed.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a vertical longitudinal section of the trap;

Fig. 2 is a transverse section on the line 2—2, Fig. 1;

Fig. 3 is a detail sectional view on the line 3—3, Fig. 2;

Figure 4:
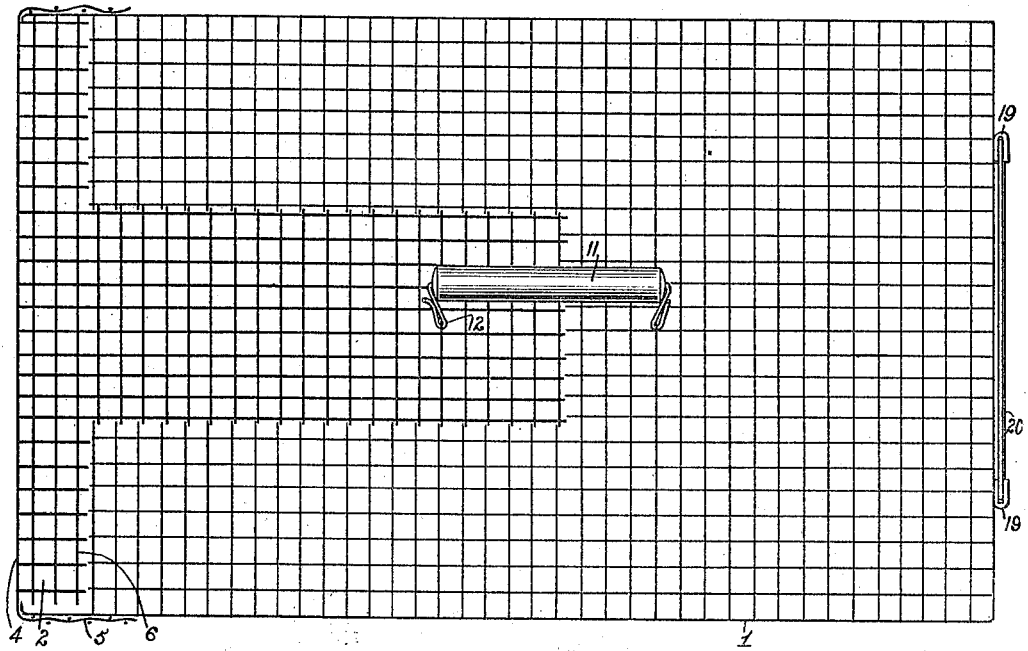
Fig. 4 is a plan view of the trap.
Figure 5:
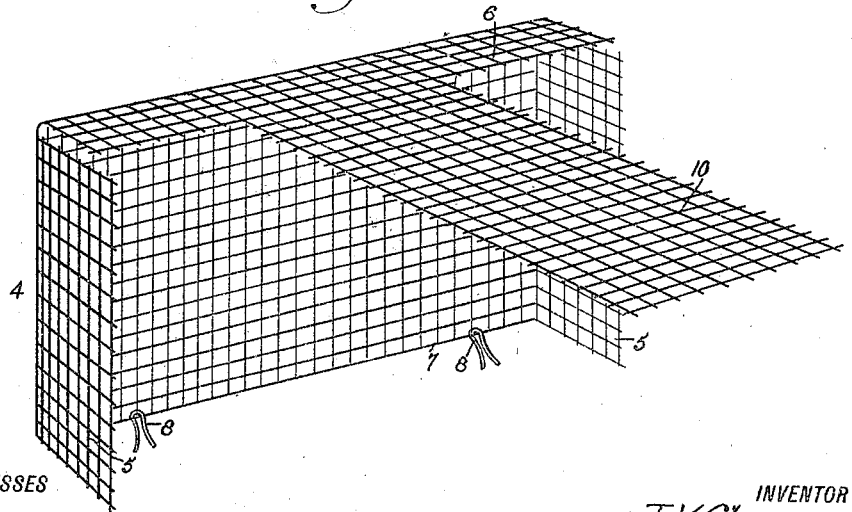
Fig. 5 is a perspective view of the door or closure for the open end of the trap body.

Referring to the drawing, 1 designates a box-like body preferably, although not necessarily, made up of wire mesh material, the said body having an open end at 2 and at the opposite end is an opening 3 which affords means of ingress. The open end 2 is normally closed by a door 4 of wire mesh material which has its side and top edges bent back to form flanges 5 and 6 which overlap the sides and top of the trap body, the bottom edge 7 being hingedly connected by wire loops 8 to the bottom 9 of the cage body, so that the door or closure can swing outwardly and downwardly to open position. The top of the door 4 has a horizontal extension 10 which overlies the top of the cage body, and this extension is engageable by a handle 11 so as to lock the door closed, as shown in Fig. 1. The handle 11 has a hook 12 which engages with the wires of the cage body and with the wires of the extension 10. By pressing downwardly on the handle when in the position shown in Fig. 1, the hook 12 can be disengaged from the door extension 10 and from the cage body, so that the door can be opened. After the hook 12 is moved downwardly it is raised through the mesh openings of the cage body and door extension so as to be entirely disengaged. When the door is closed the hook 12 is inserted downwardly through registering mesh openings and then shifted laterally to engage with the wires of the cage body and door extension, and when thus engaged the handle cannot become accidentally disconnected and the door will be effectively locked.

At the entrance opening 3 a gate or closure is provided in the form of a plurality of parallel members 13 hinged at their upper ends on a horizontal wire or rod 14 which is fastened to a frame 15. These members 13 curve downwardly and inwardly and their lower edges are formed into barbs 16 which serve to impale the rat if he attempts to escape. The edges of the members are formed with barbs 17 which serve to keep the rat away from the gate or door. A plate or equivalent device 18 extends across the front of the members at a point below their pivoted upper ends, so that the members 13 cannot swing outwardly but are free to swing inwardly. At opposite sides of the opening 3 are arranged guides 19 on the cage body, and movable in these guides is a plate or slide 20 which forms a positive closure for the entrance opening 3. When the trap is set this slide is in raised position and is so held by frictional engagement of the guides 19. The cage body may have any suitable bait holder, such as a pan 21 or a hook 22.

The members 13 increase in curvature from the outer ones toward the center, so that at the center of the opening the members will be raised somewhat from the bottom to form an opening to induce the rats to enter.

The members 13 are doubled back and forth at 13ª near their lower ends, so that the barbs 16 will be disposed inwardly and the animal will engage the doubled portions 13ª in entering and not come in contact with the points of the barbs until he is trapped and attempts to escape.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A cage of the class described comprising a body having an opening, a door for the opening, and a handle pivotally connected at one end with the body and detachably engageable at the opposite end with the body and door for holding the latter closed.

2. A cage of the class described comprising a cage body open at one end, a door hinged to the bottom of the body to close the said open end, said door having an extension normally lying over the top of the body, and a handle connected with the body and having a hook detachably engaged with the body and the extension for locking the door closed.

3. A cage of the class described comprising a cage body having an opening, a door hingedly connected with the body at the said opening and formed with an extension disposed at right-angles to the plane of the door and normally overlapping one face of the body, and a handle connected with the body and detachably engaged with the said extension to hold the door closed.

4. A cage comprising a body formed with an entrance opening, a plurality of independently movable gate members formed with barbs, and means on the body and engageable with the members for preventing the latter from moving outwardly, said members being curved inwardly, the innermost members having the greatest curvature.

5. A cage comprising a body having an opening, gate members hinged at the top of the opening and depending therefrom, the lower ends being provided with barbs and the portion above the barbs being doubled to form surfaces with which the animal engages in entering the trap without contacting with the barbs.

THEODORE VANDERBILT CLAPP.

Copies of this patent may be obtained for five cents each, by addressing the "Commissioner of Patents, Washington, D. C."